(12) United States Patent
Harck et al.

(10) Patent No.: US 10,814,426 B2
(45) Date of Patent: Oct. 27, 2020

(54) METHOD FOR ATTACHING AN OBJECT TO A STRUCTURE

(71) Applicant: DANFOSS A/S, Nordborg (DK)

(72) Inventors: Kurt Harck, Soenderborg (DK); Sigurd Larsen, Hamburg (DE)

(73) Assignee: Danfoss A/S, Nordborg (DK)

( * ) Notice: Subject to any disclaimer, the term of this patent is extended or adjusted under 35 U.S.C. 154(b) by 844 days.

(21) Appl. No.: 14/914,092

(22) PCT Filed: Sep. 19, 2014

(86) PCT No.: PCT/IB2014/064654
§ 371 (c)(1),
(2) Date: Feb. 24, 2016

(87) PCT Pub. No.: WO2015/044844
PCT Pub. Date: Apr. 2, 2015

(65) Prior Publication Data
US 2016/0214210 A1    Jul. 28, 2016

(30) Foreign Application Priority Data
Sep. 30, 2013  (EP) .................................. 13004718

(51) Int. Cl.
*B23K 26/28*    (2014.01)
*F16K 27/10*    (2006.01)
*B23K 26/06*    (2014.01)

(52) U.S. Cl.
CPC .......... *B23K 26/28* (2013.01); *B23K 26/0643* (2013.01); *F16K 27/10* (2013.01)

(58) Field of Classification Search
CPC ...... B23K 26/28; B23K 26/0643; F16K 27/10
(Continued)

(56) References Cited

U.S. PATENT DOCUMENTS 4,243,204 A * 1/1981 Siepmann ............. F16K 27/105
251/329
6,359,742 B1  3/2002 Canty et al.
(Continued)

FOREIGN PATENT DOCUMENTS

CN    2185369 Y    12/1994
CN    1992389 A    7/2007
(Continued)

OTHER PUBLICATIONS

Machine Translation of JP 2004-014173; Nov. 2018.*
(Continued)

*Primary Examiner* — Tu B Hoang
*Assistant Examiner* — Thomas J Ward
(74) *Attorney, Agent, or Firm* — McCormick, Paulding & Huber PLLC

(57) ABSTRACT

A method for attaching an object, such as a sight glass (3) or an electrical connector (4), to a structure, such as a valve housing (1), the object (3, 4) comprising an annular flange (6, 11). The object (3, 4) is mounted in an opening (7, 12) of the structure (1) with the annular flange (6, 11) in abutment with an annular edge (8, 13) of the opening (7, 12). The object (3, 4) is attached to the structure (1) by performing welding of the annular edge (8, 13) and the annular flange (6, 11) and displacing the welding beam along the annular flange (6, 11).

24 Claims, 7 Drawing Sheets

(58) Field of Classification Search
USPC .......................................... 219/121.6–121.86
See application file for complete search history.

(56) References Cited

U.S. PATENT DOCUMENTS

2007/0240897 A1    10/2007  Gafri et al.
2011/0076552 A1*   3/2011   Taniguchi ............. H01M 2/305
                                                         429/181

FOREIGN PATENT DOCUMENTS

| CN | 102034951 A | 4/2011 | | |
|---|---|---|---|---|
| DE | 100 25 189 A1 | 11/2001 | | |
| EP | 1804312 A2 | 12/2006 | | |
| EP | 2 278 200 A1 | 1/2011 | | |
| JP | H08-197269 A | 8/1996 | | |
| JP | 2008251411 A | 10/2008 | | |
| JP | 2004-014173 | * | 7/2009 | ............. H01M 2/30 |
| NL | 70986 | 10/1952 | | |

OTHER PUBLICATIONS

Examination Report for Serial No. 14 787 276.6 dated May 23, 2018.
International Search Report for Serial No. PCT/IB2014/064654 dated Feb. 20, 2015.
International Search Report for PCT Serial No. PCT/ IB2014/ 064654 dated Feb. 20, 2015.
Indian First Examination Report for corresponding India Application No. 201617004652 dated Jul. 9, 2019.

* cited by examiner

METHOD FOR ATTACHING AN OBJECT TO A STRUCTURE

CROSS-REFERENCE TO RELATED APPLICATIONS

This application is entitled to the benefit of and incorporates by reference subject matter disclosed in the International Patent Application No. PCT/IB2014/064654 filed on Sep. 19, 2014 and European Patent Application No. 13004718 filed on Sep. 30, 2013.

TECHNICAL FIELD

The present invention relates to a method for attaching an object to a structure, such as attaching sight glasses and electrical connectors to a valve housing. The invention further relates to an object for mounting on a structure, using the method of the invention.

BACKGROUND

A valve housing may be provided with sight glasses, electrical connectors, mounting flanges, etc. Such objects may be attached to the structure using a welding technique, such as laser welding. In prior art methods for attaching such objects to a structure, it is necessary to perform welding along a direction which is substantially perpendicular to a direction of mounting the object on the structure. The consequence is that either the structure must be rotated during the welding step around an axis parallel with the direction of mounting the object on the structure, or the welding equipment must be moved around the structure around the axis parallel with the direction of mounting the object on the structure. This makes it difficult to perform the welding, because of need for additional equipment for rotating either the structure or the welding equipment.

US 2011/0076552 A1 discloses a method for fixing a collector attached to a substrate of an electrode assembly to a terminal. A negative electrode terminal has a terminal portion formed on one side of a flange portion, and a cylindrical crimping member on the other side. The cylindrical crimping member is inserted through openings formed in a first insulating member, a sealing plate, a second insulating member, and a negative electrode collector. A peripheral portion of a thin-walled portion formed at the tip end portion of the cylindrical crimping member is thoroughly adhered and welded by a high energy beam to the edge of a countersunk hole.

SUMMARY

It is an object of embodiments of the invention to provide a method for attaching an object to a structure, which at least reduces the need for rotating the structure and/or the welding equipment according to prior art methods.

It is a further object of embodiments of the invention to provide a method for attaching an object to a structure, where rotation of the structure is completely eliminated during performance of the method.

It is an even further object of embodiments of the invention to provide a method for attaching an object to a structure, where rotation of the welding equipment around the structure is eliminated during performance of the method.

It is an even further object of embodiments of the invention to provide a method for attaching an object to a structure, where a strong connection between the object and the structure is obtained.

It is an even further object of the invention to provide an object for mounting on a structure, which allows the object to be attached to the structure in a manner which at least reduces the need for rotating the structure and/or the welding equipment during attachment compared to attachment of prior art objects.

According to a first aspect, the invention provides a method for attaching an object to a structure, the method comprising the steps of:
  providing an opening in the structure, the opening defining an annular edge along a circumference of the opening,
  providing an object comprising an object body extending in a longitudinal direction, and an annular flange extending in a direction being substantially perpendicular to the longitudinal direction, the annular flange defining an outer circumference which is arranged at a distance from an outer surface of the object body, along the direction being substantially perpendicular to the longitudinal direction, and defining a surface extending radially outwards from the outer surface of the object body towards the outer circumference,
  mounting the object in the opening of the structure with the annular flange in abutment with the annular edge,
  attaching the object to the structure by performing welding of the annular edge and the annular flange by
    directing a welding beam at least partly onto the surface defined by the annular flange, in a region defined by an abutment region between a part of the object mounted in the opening and an annular wall of the opening, the welding beam being directed at an angle with respect to the longitudinal direction, the angle being between 0 degrees and 15 degrees, and
    displacing the welding beam along the surface defined by the annular flange, while maintaining the angle between the welding beam and the longitudinal direction.

The object to be attached by the method according to the invention may be significantly smaller than the structure. As example, the structure may be a housing, such as a valve housing, and the object may be a part which must be attached to the housing, as example a sight glass, an electrical connector, a mounting flange for objects, etc. Alternatively, the structure and the object may have similar sizes.

An opening is provided in the structure. The opening defines an annular edge along a circumference of the opening. The annular edge follows the circumference of the opening. The opening extends through a wall of the structure. The opening may, as example, provide a passage between an interior of the structure and the exterior of the structure.

The opening may be provided during manufacture of the structure, as example during moulding, casting or machining of the structure. As an alternative, the opening may be provided after the structure as such has been manufactured, as example by drilling or punching.

Furthermore, an object is provided. The object comprises an object body and an annular flange. The object body extends in a longitudinal direction, which means that the object body is longer along the longitudinal direction than along a transverse direction. The object may be substantially rotationally symmetric about an axis extending along the longitudinal direction.

The annular flange extends in a direction being substantially perpendicular to the longitudinal direction. Furthermore, the annular flange defines an outer circumference, which is arranged at a distance from an outer surface of the object body, along the direction being substantially perpendicular to the longitudinal direction. Thereby the annular flange defines a surface which extends radially outwards from the outer surface of the object body towards the outer circumference. The surface extends in a plane which is substantially perpendicular to the longitudinal direction.

The object is mounted in the opening of the structure with the annular flange in abutment with the annular edge. The opening of the structure preferably has a size and shape which allows the object body, or part of the object body, to pass through the opening, but which does not allow the annular flange, protruding from the object body, to pass through the opening. Because the annular flange is arranged in abutment with the annular edge, the annular flange and the annular edge forms a contact region between the structure and the object.

The object may be mounted in the opening by moving the object along a direction which is substantially parallel to the longitudinal direction. However, the step of mounting the object could be performed in other ways.

After the object is mounted in the opening of the structure with the annular flange in abutment with the annular edge, the object is attached to the structure by performing welding of the annular edge and the annular flange. The welding is performed by directing a welding beam at least partly onto the surface defined by the annular flange. The entire welding beam may be directed onto the surface, or a part of the welding beam may be directed onto the surface, while the remaining part of the welding beam is directed onto a surface of the structure or a surface of the object body. Thereby the object and the structure are welded together at the contact region between the annular flange and the annular edge.

The welding beam is directed onto the surface of the annular flange in a region defined by an abutment region between a part of the object mounted in the opening and an annular wall of the opening. When the object is mounted in the opening of the structure, a part of the object abuts against an annular wall formed by the structure at the position of the opening. Thereby an abutment region between the object and the opening of the structure is defined. Thus, the object slides against the annular wall of the opening when it is inserted into the opening. The abutment region may, e.g., be defined between an outer surface of the object body and an inner surface of the opening in the structure.

By directing the welding beam onto the annular flange in a region defined by this abutment region it is obtained that the welding is positioned between the two parts being welded together. Thus, the welding is arranged directly between the two parts, and thereby a very strong welding joint is obtained, and the strength of the welding joint is determined purely by how deep into the abutment region the welding beam reaches. This kind of welding is sometimes referred to as a 'butt joint'. On the other hand, in the case that the welding beam is directed onto a surface of one part, and only reaches the second part via the first part, the strength of the welding joint is limited by the thickness of the first part. Therefore, in this case it is not possible to obtain a welding joint which is as strong as is the case when a butt joint is used. This is sometimes referred to as a 'plate joint'.

Furthermore, the welding beam is directed towards the annular flange at an angle in relation to the longitudinal direction, the angle being between 0 degrees and 15 degrees, such as between 0 degrees and 10 degrees, such as between 0 degrees and 5 degrees. The direction of the welding beam is close to being parallel with the longitudinal direction or is parallel with the longitudinal direction. The welding beam is displaced along the surface defined by the annular flange, while maintaining the angle between the welding beam and the longitudinal direction. Thereby the structure and the object are welded together along the contact region, by displacing the welding beam.

It is an advantage that the welding beam is directed towards the surface defined by the annular flange at an angle in relation to the longitudinal direction which is between 0 degrees and 15 degrees, and that the welding beam being displaced along the surface, because thereby it is possible to attach the object to the structure without having to rotate the structure, and without having to move the welding equipment around the entire structure, only around the annular flange. The object is attached to the structure by displacing a welding beam generated by just a part of the welding equipment in order to displace the welding beam along the surface defined by the annular flange. As an alternative, the welding beam may be displaced using an optical arrangement, e.g. including one or more mirrors in case of laser welding.

The annular flange of the object protruding from the object body and defining a surface extending in a plane which is substantially perpendicular to the longitudinal direction, is an advantage because of the possibility of a welding region which can be reached by the welding beam without having to rotate the structure, and without having to move the welding equipment around the entire structure, as is the case in prior art methods where the welding beam is directed towards the object and/or the structure in a direction which is substantially perpendicular, and not substantially parallel, to the longitudinal direction defined by the object to be attached to the structure.

The method according to the first aspect of the invention allows an object to be attached to a structure, such as a sight glass, an electrical connector or another object to be attached to a valve structure, in a cost effective manner and in a manner eliminating additional equipment, because the method according to the invention does not require that the structure is rotated or that the welding equipment is moved around the entire structure.

Attaching the object to the structure may comprise performing welding by directing the welding beam towards the surface of the annular flange in a direction being substantially parallel to the longitudinal direction of the object body. The angle between the welding beam and the longitudinal direction may be 0 degrees or at least very close to 0 degrees.

The opening in the structure may define an axial direction defining the longitudinal direction for placing the object in the structure, and the step of attaching the object to the structure may comprise performing welding by directing the welding beam towards the surface of the annular flange substantially parallel to the axial direction of the opening.

When the object is mounted in the opening in the structure, the axial direction of the opening may be substantially parallel to the longitudinal direction defined by the object body.

Preferably, the step of attaching the object to the structure may be performed by means of laser welding. During laser welding the welding equipment only transfers heat to the parts being welded in a very local area. Therefore the structure and the object as such are not heated when the object is attached by means of laser welding, but only a small region at and near the welding position is heated. Thereby it is possible to manufacture parts of the structure and the object, which are not to be positioned near the welding position, from materials which are not capable of withstanding high temperatures, such as temperatures exceeding 120° C. Examples of such materials are plastic materials.

Alternatively, other kinds of welding may be used.

Attaching the object to the structure may comprise melting at least part of the annular flange of the object. In this case the annular flange may be partly or completely melted as a consequence of the welding. When the welding has been completed, at least part of the annular flange no longer exists as a separate part. At least part of the annular flange forms part of the annular edge defined by the opening of the structure and constitutes a connection between the annular flange of the structure and the object.

After the annular flange has been melted, the welding beam continues into the abutment region between the object and the opening, thereby directly welding the two parts together, as described above.

Attaching the object to the structure may further comprise at least partly melting the annular edge of the opening of the structure. According to this embodiment, the annular flange and the annular edge melt together and form a combined region as a consequence of the welding.

The structure may be a housing, such as a valve housing, or another kind of housing. Alternatively, the structure may be any other suitable kind of structure.

If the structure is a valve housing, the object may be a sight glass. A sight glass allows visual inspection of parts inside the valve housing without having to dissemble the valve housing.

Alternatively, the object may be an electrical connector for providing electrical connection to one or more components inside the valve housing. The component may be a motor for operating one or more movable valve parts for controlling an opening degree of the valve. The component may also be a sensor, and the electrical connector may provide electrical connection between the sensor and measuring equipment arranged outside the valve housing.

Mounting the object in the opening of the structure may comprise positioning at least a part of the object inside the structure. According to this embodiment, a part of the object is inserted inside the structure when it is attached to the structure. For example, if the object is an electrical connector, at least one or more connector pins may be positioned in the interior part of the structure, in order to allow the connector pin(s) to establish electrical contact between a component, such as a motor or a sensor, in the interior part of the structure, and a power source or measuring equipment outside the structure. As another example, if the object is a sight glass, most of the object may advantageously be positioned in the interior part of the structure. Thereby the object does not protrude from the structure, and a smooth outer surface of the structure is provided. Furthermore, the sight glass is positioned closer to the parts which are to be visually inspected, thereby making it easier to inspect these parts.

The annular flange of the object may be arranged in an outer surface plane of the object when the object is mounted in the opening of the structure. According to this embodiment, substantially the entire object is positioned in the interior part of the structure. Because the annular flange is arranged in the outer surface plane of the object, the connecting region between the structure and the object, defined by the annular flange and the annular edge, is also arranged substantially in the outer surface plane of the object. Accordingly, the outer surface of the object is substantially flush with an outer surface of the structure, i.e. the object does not protrude from the structure, or the object only protrudes slightly from the structure.

According to a second aspect the invention provided an object for mounting on a structure, the object comprising:
    an object body extending along a longitudinal direction, and
    an annular flange extending in a direction being substantially perpendicular to the longitudinal direction, the annular flange defining an outer circumference which is arranged at a distance from an outer surface of the object body, along the direction being substantially perpendicular to the longitudinal direction, and defining a surface extending radially outwards from the outer surface of the object body towards the outer circumference,
wherein the annular flange has a thickness along the longitudinal direction which is within the interval 0.1 mm to 1.0 mm.

A person skilled in the art would readily recognise that any feature described in combination with the first aspect of the invention could also be combined with the second aspect of the invention, and vice versa. Thus, the object according to the second aspect of the invention may advantageously be attached to a structure by means of a method according to the first aspect of the invention.

The object according to the second aspect of the invention comprises an object body and an annular flange as described above with reference to the first aspect of the invention. As described above, the object according to the second aspect of the invention may allow the object to be welded to a structure without having to rotate the entire structure, or without having to move the welding equipment around the entire structure.

Furthermore, the annular flange has a thickness along the longitudinal direction which is within the interval 0.1 mm to 1.0 mm. Accordingly, the annular flange is relatively thin. When welding is performed by directing a welding beam towards the surface defined by the annular flange, the heat provided by the welding beam is able to penetrate through the annular flange, and heating of a structure arranged on the opposite side of the annular flange is provided. Furthermore, since the annular flange is relatively thin, it is possible to melt at least part of the annular flange during welding. At least part of the annular flange ceases to exist as a result of the welding, and the annular flange forms part of an integral attachment region together with a part of the structure, e.g. an annular edge, as described above with reference to the first aspect of the invention.

The thickness of the annular flange may be within the interval 0.1 mm to 0.8 mm, such as within the interval 0.2 mm to 0.5 mm, such as approximately 0.3 mm.

The annular flange may have a size along the direction being substantially perpendicular to the longitudinal direction which is within the interval 0.1 mm to 5 mm, such as within the interval 0.1 mm to 4 mm, such as within the interval 0.1 mm to 3 mm, such as within the interval 0.1 mm to 2 mm, such as within the interval 0.2 mm to 1 mm, such as within the interval 0.2 mm to 0.5 mm, such as approximately 0.3 mm. According to this embodiment, the annular flange is also relatively small along the direction being substantially perpendicular to the longitudinal direction, making it easier to melt at least part of the annular flange by means of a welding beam.

The object may be a sight glass or an electrical connector, as described above.

BRIEF DESCRIPTION OF THE DRAWINGS

The invention will now be described in further details with reference to the accompanying drawings, in which.

DETAILED DESCRIPTION

Figure 1:
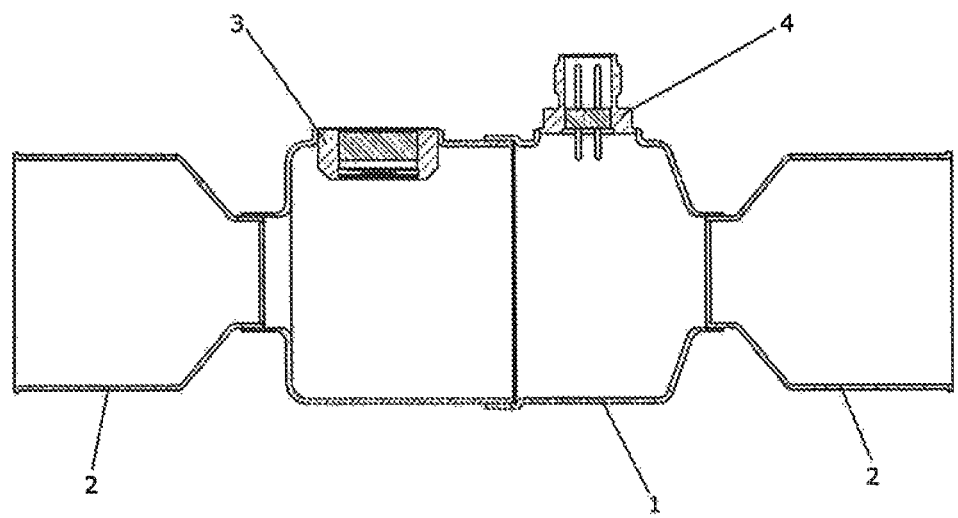
FIG. 1 is a cross sectional view of a valve housing having a sight glass and an electrical connector attached thereto.

FIG. 1 is a cross sectional view of a valve housing 1 having two connector pipes 2 connected thereto. Fluid enters the valve housing 1 via one of the connector pipes 2, and leaves the valve housing 1 via the other connector pipe 2.

Two objects, a sight glass 3 and an electrical connector 4, are attached to the valve housing 1. This will be described in further detail below.

A number of valve parts (not shown) may be arranged inside the valve housing 1.

Figure 2:
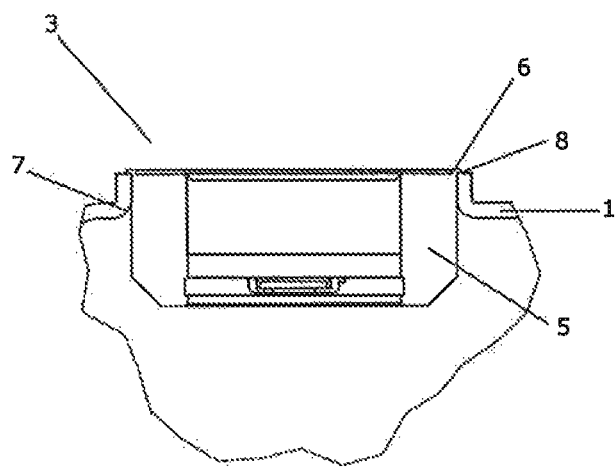
FIG. 2 is a detail of the valve housing of FIG. 1, showing a sight glass.

FIG. 2 is a detail of the valve housing of FIG. 1, showing the sight glass 3. The sight glass 3 comprises a sight glass body 5, and an annular flange 6. The annular flange 6 has a limited thickness compared to prior art flanges of sight glasses. The annular flange 6 has a thickness within the interval 0.1 mm to 5 mm. In the embodiment shown, the annular flange 6 has a thickness of approximately 0.3 mm. The sight glass 3 is mounted in an opening 7 formed in the valve housing 1 in such a manner that substantially the entire sight glass body 5 is positioned in an interior part of the valve housing 1, and the annular flange 6 is arranged in abutment with an annular edge 8 defined by the opening 7.

The sight glass 3 has been attached to the valve housing 1 by means of welding. The annular flange 6 extends substantially perpendicular from the sight glass body 5, thereby allowing the welding to be performed by directing a welding beam onto a surface of the annular flange 6, from above in the Figure. Thereby the welding can be performed by moving the welding equipment along a circular path, following the annular flange 6, above the sight glass 3. Alternatively, the welding beam may be displaced along the circular path using an optical arrangement, e.g. including one or more mirrors when laser welding is used. It is not necessary to rotate the valve housing 1, or to move the welding equipment around the valve housing 1.

Figure 3:
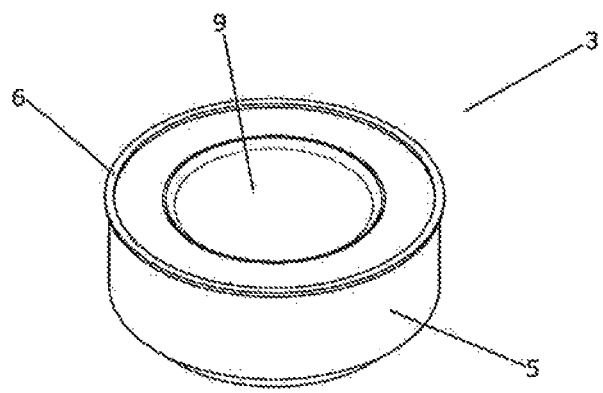
FIGS. 3-6 illustrate the sight glass of FIG. 2.
Figure 4:
Figure 5:
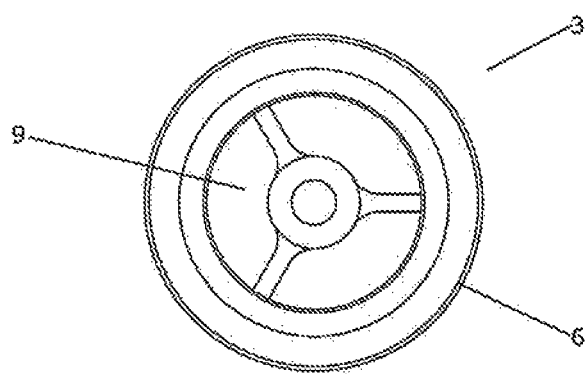
Figure 6:
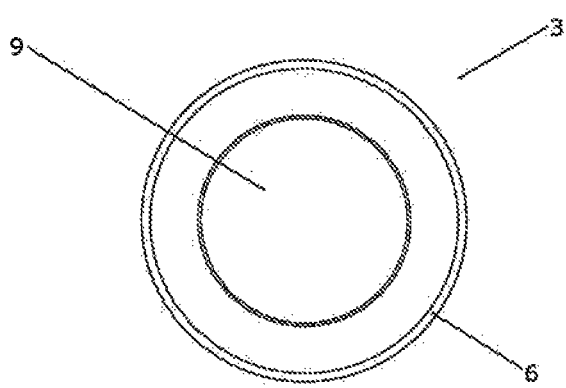

FIGS. 3-6 illustrate the sight glass 3 of FIG. 2. FIG. 3 is a perspective view, FIG. 4 is a side view, FIG. 5 is a top view, and FIG. 6 is a bottom view of the sight glass 3.

The sight glass 3 comprises the sight glass body 5 and the annular flange 6. The sight glass body 5 has a substantially cylindrical shape, and the axis of symmetry of the cylindrical shape defines a longitudinal direction of the sight glass 3.

The sight glass 3 comprises a glass core 9 arranged in the centre of the cylindrical sight glass body 5. When the sight glass 3 is mounted in a structure, such as in a valve housing, it is possible to visually inspect parts arranged in the interior of the structure through the glass core 9.

The annular flange 6 is adapted to be arranged in abutment with an annular edge defined by an opening in a structure, such as a valve housing. Thereby the annular flange 6 provides a surface onto which a welding beam can be directed in order to weld the sight glass 3 onto the structure. The orientation of the annular flange 6, in particular the orientation of the surface, results in the welding beam being directed onto the annular flange in a direction which is close to parallel to, or which is parallel to, the longitudinal direction defined by the cylindrical sight glass body 5. Thereby the sight glass 3 can be welded onto a structure by moving the welding equipment along a circular path defined by the annular flange 6, or by displacing the welding beam using an optical arrangement, e.g. including one or more mirrors when laser welding is used. Rotating the structure or moving the welding equipment around the entire structure is not necessary.

The annular flange 6 has a limited thickness compared to prior art flanges of sight glasses. The annular flange 6 has a thickness within the interval 0.1 mm to 5 mm. In the embodiment shown, the annular flange 6 has a thickness of approximately 0.3 mm. An annular flange 6 having a limited thickness allows heat generated by the welding beam to penetrate through the annular flange 6, and to reach the part of the structure which is arranged on the opposite side of the annular flange 6 relative to where the welding beam is directed onto the annular flange 6. Thereby the sight glass body 5 is welded to the structure. Furthermore, because the annular flange 6 has a limited thickness, it is possible within a limited amount of time to completely melt the annular flange 6 by means of a welding beam.

Figure 7:
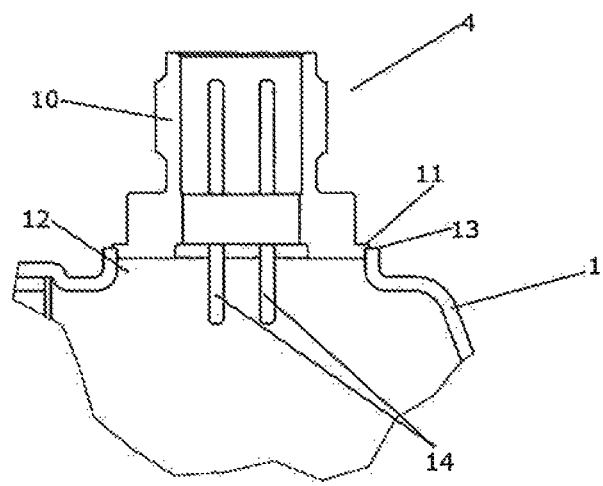
FIG. 7 is a detail of the valve housing of FIG. 1, showing the electrical connector.

FIG. 7 is a detail of the valve housing of FIG. 1, showing the electrical connector 4. The electrical connector 4 comprises a connector body 10 and an annular flange 11. The annular flange 11 of the electrical connector 4 has a limited thickness compared to prior art flanges of sight glasses. In the embodiment shown, the thickness of the annular flange is approximately 0.3 mm. An annular flange 11 having a limited thickness has the advantages of allowing heat generated by the welding beam to penetrate through the annular flange 11, and to reach the part of the structure which is arranged on the opposite side of the annular flange 11 relative to where the welding beam is directed onto the annular flange 11. Thereby the electrical connector 4 is welded to the structure. Furthermore, because the annular flange 11 has a limited thickness, it is possible within a limited amount of time to completely melt the annular flange 11 by means of a welding beam.

The electrical connector 4 is mounted in an opening 12 formed in the valve housing 1 in such a manner that the annular flange 11 is arranged in abutment with an annular edge 13 defined by the opening 12.

The electrical connector 4 comprises four connector pins 14, two of which are visible in FIG. 7. The electrical connector 4 is arranged in the opening 12 of the valve housing 1 in such a manner that the connector pins 14 protrude into the interior of the valve housing 1. The electrical connector 4 establishes electrical contact between a component, such as a motor or a sensor, inside the valve housing 1, and a power source or measuring equipment outside the valve housing 1.

Figure 8:
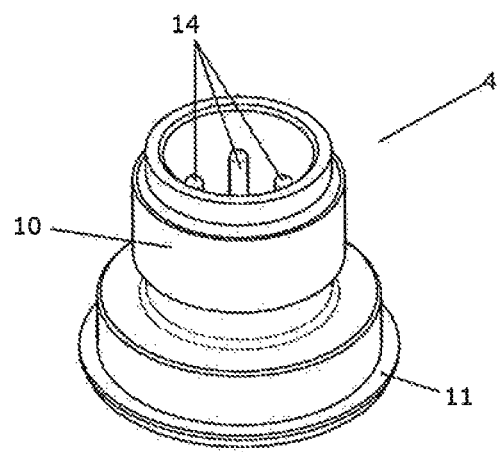
FIGS. 8-11 illustrate the electrical connector of FIG. 7.
Figure 9:
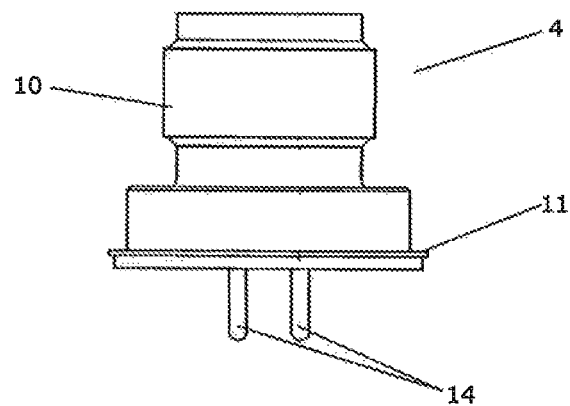
Figure 10:
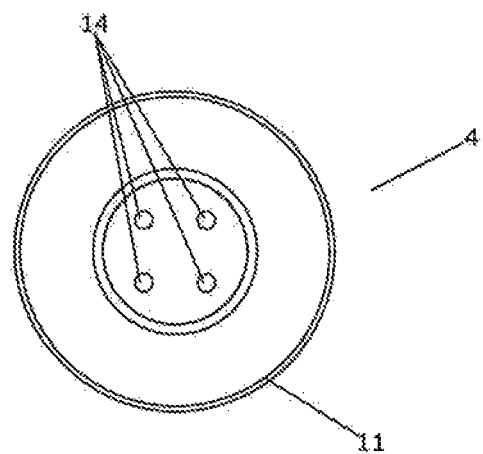
Figure 11:
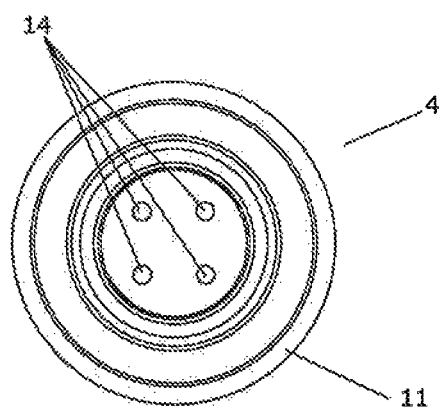

FIGS. 8-11 illustrate the electrical connector 4 of FIG. 7. FIG. 8 is a perspective view, FIG. 9 is a side view, FIG. 10 is a bottom view, and FIG. 11 is a top view.

The annular flange 11 is adapted to be arranged in abutment with an annular edge defined by an opening in a structure, such as a valve housing. The annular flange 11 provides a surface onto which a welding beam is to be directed in order to weld the electrical connector 4 onto the structure. The orientation of the annular flange 11, in particular the orientation of the surface of the annular flange 11, ensures that the welding beam can be directed onto the annular flange 11 in a direction which is close to parallel to, or is parallel to, the longitudinal direction defined by the cylindrical connector body 10. Thereby the electrical connector 4 can be welded onto a structure by moving the welding equipment along a circular path defined by the annular flange 11, or by displacing the welding beam using an optical arrangement, e.g. including one or more mirrors when using laser welding, for directing a laser welding beam towards the annular flange 11. Rotating the structure or moving the welding equipment around the entire structure is not needed.

Figure 12:
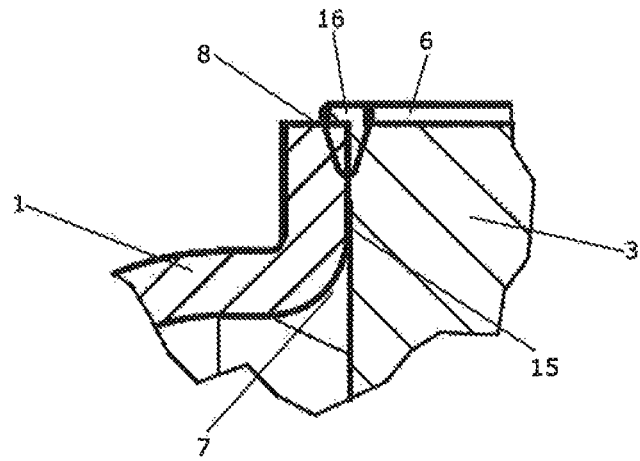
FIG. 12 is a detail of the sight glass of FIG. 2.

FIG. 12 is a detail of the sight glass 3 of FIG. 2, illustrating a position of a welding beam directed towards the annular flange 6 of the sight glass 3 when the sight glass 3 is attached to the valve housing 1. An abutment region 15 is defined between the sight glass 3 and an inner annular surface of the opening 7. During the step of attaching the sight glass 3 to the valve housing 1, a welding beam is directed towards the annular flange 6 at the position corresponding to the position of the abutment region 15. This is illustrated by welding seam 16. It can be seen that the welding seam 16 reaches into the abutment region 15, and that the sight glass 3 and the inner annular surface of the opening 7 are thereby welded directly to each other. Accordingly, a very strong welding joint is obtained.

Figure 13:
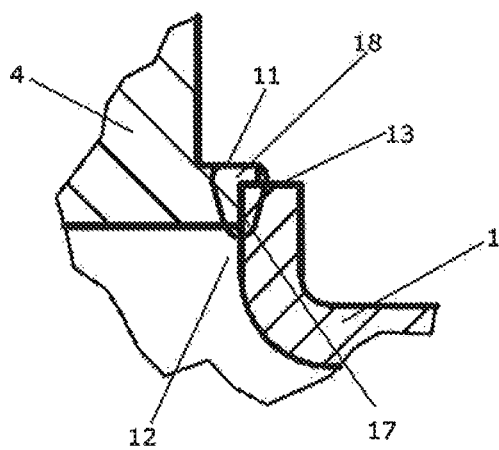
FIG. 13 is a detail of the electrical connector of FIG. 7.

FIG. 13 is a detail of the electrical connector 4 of FIG. 7, illustrating a position of a welding beam directed towards the annular flange 11 of the electrical connector 4 when the electrical connector 4 is attached to the valve housing 1. An abutment region 17 is defined between the electrical connector 4 and an inner annular surface of the opening 12. During the step of attaching the electrical connector 4 to the valve housing 1, a welding beam is directed towards the annular flange 6 at the position corresponding to the position of the abutment region 15. This is illustrated by welding seam 18. It can be seen that the welding seam 18 reaches into the abutment region 17, and that the electrical connector 4 3 and the inner annular surface of the opening 12 are thereby welded directly to each other. Accordingly, a very strong welding joint is obtained.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for attaching an object to a valve housing, the method comprising the steps of:
providing an opening in the valve housing, the opening defining an annular edge along a circumference of the opening,
providing an object comprising an object body extending in a longitudinal direction, and an annular flange extending in a direction being substantially perpendicular to the longitudinal direction, the annular flange defining an outer circumference which is arranged at a distance from an outer surface of the object body, along the direction being substantially perpendicular to the longitudinal direction, and defining a surface extending radially outwards from the outer surface of the object body towards the outer circumference,
mounting the object in the opening of the valve housing with the annular flange in abutment with the annular edge,
attaching the object to the valve housing by performing welding of the annular edge and the annular flange by:
directing a welding beam at least partly onto the surface defined by the annular flange, in a region defined by an abutment region between a part of the object mounted in the opening and an inner annular surface of the valve housing, the welding beam being directed at an angle with respect to the longitudinal direction, the angle being between 0 degrees and 15 degrees, and
displacing the welding beam along the surface defined by the annular flange, while maintaining the angle between the welding beam and the longitudinal direction to form a welding,
wherein the welding extends from a surface defined by the annular flange to a part of a structure arranged on an opposite side of the surface defined by the annular flange.

2. The method according to claim 1, wherein the step of attaching the object to the valve housing comprises performing welding by directing the welding beam towards the surface of the annular flange substantially parallel to the longitudinal direction of the object body.

3. The method according to claim 1, wherein the opening of the valve housing defines an axial direction, and wherein the step of attaching the object to the valve housing comprises performing welding by directing the welding beam towards the surface of the annular flange substantially parallel to the axial direction of the opening.

4. The method according to claim 1, wherein the step of attaching the object to the valve housing is performed by means of laser welding.

5. The method according to claim 1, wherein the step of attaching the object to the valve housing comprises melting the annular flange of the object.

6. The method according to claim 5, wherein the step of attaching the object to the valve housing further comprises at least partly melting the annular edge of the opening of the valve housing.

7. The method according to claim 1, wherein the object is a sight glass.

8. The method according to claim 1, wherein the object is an electrical connector for providing electrical connection to one or more components arranged inside the valve housing.

9. The method according to claim 1, wherein the step of mounting the object in the opening of the valve housing comprises positioning at least a part of the object in an interior part of the valve housing.

10. The method according to claim 9, wherein the annular flange of the object is arranged in an outer surface plane of the object when the object is mounted in the opening of the valve housing.

11. A combination of an object on a valve housing, the object comprising:
an object body extending along a longitudinal direction, and
an annular flange extending in a direction being substantially perpendicular to the longitudinal direction, the annular flange defining an outer circumference which is arranged at a distance from an outer surface of the object body, along the direction being substantially perpendicular to the longitudinal direction, and defining a surface extending radially outwards from the outer surface of the object body towards the outer circumference, wherein the object is mounted in an opening of the valve housing, the opening defining an annular edge along a circumference of the opening, wherein the annular flange of the object is in abutment with the annular edge and the annular flange and the annular edge are welded, wherein the welding is arranged directly between an outer surface of the object body and an inner annular surface of the valve housing, and wherein the welding extends from a surface defined by the annular flange to a part of a structure arranged on an opposite side of the surface defined by the annular flange.

12. The combination according to claim 11, wherein the annular flange has a size along the direction being substantially perpendicular to the longitudinal direction which is within the interval 0.1 mm to 5 mm.

13. The combination according to claim 11, wherein the object is a sight glass.

14. The combination according to claim 11, wherein the object is an electrical connector.

15. The method according to claim 2, wherein the opening of the valve housing defines an axial direction, and wherein the step of attaching the object to the valve housing comprises performing welding by directing the welding beam towards the surface of the annular flange substantially parallel to the axial direction of the opening.

16. The method according to claim 2, wherein the step of attaching the object to the valve housing is performed by means of laser welding.

17. The method according to claim 3, wherein the step of attaching the object to the valve housing is performed by means of laser welding.

18. The method according to claim 2, wherein the step of attaching the object to the valve housing comprises melting the annular flange of the object.

19. The method according to claim 3, wherein the step of attaching the object to the valve housing comprises melting the annular flange of the object.

20. The combination according to claim 11, wherein the annular flange has a thickness along the longitudinal direction which is within the interval 0.1 mm to 1.0 mm.

21. The method according to claim 1, wherein the annular flange at least partially overlaps the annular edge in a direction perpendicular to the longitudinal direction.

22. The combination according to claim 11, wherein the annular flange at least partially overlaps the annular edge in a direction perpendicular to the longitudinal direction.

23. The method according to claim 1, wherein the step of attaching the object to the valve housing results in a butt joint weld between at least a portion of the outer surface of the object body and the inner annular surface of the opening of the valve housing.

24. The method according to claim 1, wherein heat generated by the welding beam penetrates through the annular flange and heats a structure arranged on an opposite side of the surface defined by the annular flange.

* * * * *